(12) United States Patent
Park et al.

(10) Patent No.: US 7,026,394 B2
(45) Date of Patent: Apr. 11, 2006

(54) THERMOPLASTIC POLYMERIC COMPOSITIONS

(75) Inventors: Jung Hoon Park, Kyoungki-do (KR); Yeong-Chool Yu, Seoul (KR)

(73) Assignee: Rhodia Engineering Plastics, S.A, Saint Fons Cedex (FR)

( * ) Notice: Subject to any disclaimer, the term of this patent is extended or adjusted under 35 U.S.C. 154(b) by 182 days.

(21) Appl. No.: 10/257,546

(22) PCT Filed: Apr. 10, 2001

(86) PCT No.: PCT/FR01/01097

§ 371 (c)(1),
(2), (4) Date: Jul. 29, 2003

(87) PCT Pub. No.: WO01/79353

PCT Pub. Date: Oct. 25, 2001

(65) Prior Publication Data

US 2004/0048981 A1    Mar. 11, 2004

(30) Foreign Application Priority Data

Dec. 4, 2000 (FR) .................................. 00 04696

(51) Int. Cl.
*C08L 77/00* (2006.01)
*C08L 55/02* (2006.01)
*C08L 51/04* (2006.01)

(52) U.S. Cl. ........................................................ 525/66

(58) Field of Classification Search .................. 525/66
See application file for complete search history.

(56) References Cited

U.S. PATENT DOCUMENTS

| 5,278,231 | A | | 1/1994 | Chundury |
| 5,650,466 | A | | 7/1997 | Gottschalk et al. |
| 5,837,772 | A | * | 11/1998 | Mc Kee et al. ............... 525/66 |
| 5,965,666 | A | | 10/1999 | Lim et al. |
| 2004/0048981 | A1 | * | 3/2004 | Park et al. .................... 525/71 |

FOREIGN PATENT DOCUMENTS

| EP | 0 276 512 | 8/1988 |
| EP | 0 855 431 | 7/1998 |

* cited by examiner

*Primary Examiner*—Jeffrey Mullis
(74) *Attorney, Agent, or Firm*—Buchanan Ingersoll, P.C.

(57) ABSTRACT

The invention concerns thermoplastic polymeric compositions, comprising polyamide, having a high plastic strain temperature and good paintability. Said compositions comprise a polyamide, a rubber copolymer and vinyl monomers, made compatible by a styrene polymer.

11 Claims, No Drawings

THERMOPLASTIC POLYMERIC COMPOSITIONS

The present invention relates to thermoplastic polymer compositions which have good dimensional stability and good impact resistance and whose surfaces have good paintability. They may be employed for the manufacture of mouldings. for use in various types of electrical equipment and for the manufacture of parts for use in the automotive industry.

Polyamide is a chemically resistant polymer which is stable at elevated temperature and which can be blended with other types of polymer to form blends which are easier to mould and more impact-resistant. Both aliphatic and aromatic polyamides are incompatible with, or at best have poor compatibility with, polymers such as the copolymers and grafted polymers of styrene with acrylates, acrylonitriles or the like. This lack of compatibility can be understood as meaning that it is impossible to blend the polymers, and the result can be heterogeneous compositions which tend to separate into their constituent phases and which present problems of separation of the components when the compositions are injection moulded or extruded.

In order to avoid this separation and to improve the compatibility of the components of the blend, it is known that polymeric compounds, mostly those bearing grafted maleic anhydride functions, can be added to the mixture.

A very large number of solutions has been described for compatibilizing polyamide and styrenic grafted copolymers, such as ABS. The compositions thus described have interesting characteristics with regard to certain properties. U.S. Pat. No. 5,965,666, for example, describes compositions comprising polyamide, an ABS-type copolymer, and two compatibilizing copolymers: maleic-anhydride-grafted styrene-maleimide and maleic-anhydride-grafted styrene-ethylene-butylene-styrene.

Despite the progress made, attempts continue to propose new compositions with improved properties and/or with controlled costs. The properties generally aimed at are impact strength, rigidity, the temperature for deformation under load, dimensional stability, surface appearance and paintability.

The object of the present invention is therefore to propose other compositions having properties, or a property profile, which are suitable for the applications envisaged.

For this purpose the present invention proposes a thermoplastic polymeric composition comprising the following compounds:

(A) from 1 to 97% by weight, with respect to the total weight of the composition, of a polyamide,
(B) from 1 to 97% by weight, with respect to the total weight of the composition, of a copolymer containing a rubber onto which are grafted acrylonitrile and a styrenic. compound chosen from styrene and α-methylstyrene, the copolymer containing from 10 to 90% by weight of rubber,
(C) from 0.5 to 97% by weight, with respect to the total weight of the composition, of a styrene-maleimide copolymer grafted with functional groups chosen from carboxylic acids and acid anhydride,
(D) from 0.5 to 97% by weight, with respect to the total weight of the composition, of an ungrafted styrene-maleimide copolymer,
(E) from 0 to 50% of an impact modifier.
(F) from 0 to 50% by weight of a maleic-anhydride-grafted styrene-ethylene-butylene-styrene copolymer.

Once they have been shaped, for example by moulding, the compositions according to the invention have good impact resistance, good dimensional stability, due to low moisture retention, and a high deformation temperature.

These blends comprise from 1 to 97% by weight, with respect to the total weight of the blend, of one or more semicrystalline polyamides (A). The polyamides which may be used for working the invention are obtained by polycondensing amino acids or lactams, for example nylon-6. Very particular preference is given to nylon-6, nylon-11, nylon-12, the copolyamide nylon-6/6,36, and mixtures and copolymers based on these polyamides or copolyamides.

The proportion by weight of polyamide in the composition is preferably between 30 and 70%.

The compound (B) is a copolymer comprising a natural or synthetic rubber onto which has been grafted acrylonitrile and a styrenic compound chosen from styrene and α-methylstyrene. The copolymer preferably contains between 10 and 90% by weight of rubber.

The rubber is preferably chosen from the group consisting of polybutadiene, butadiene-styrene rubber, butadiene-acrylate rubber, butadiene-acrylonitrile rubber, EPR (ethylene-propylene rubber) and EPDM (ethylene-propylene-diene rubber) or a mixture of two or more of these rubbers. The rubber content of the entirety of the copolymer (B) is preferably from 20 to 40% by weight.

The grafted copolymer (B) may be prepared in the usual way, for example by polymerization in bulk, in solution or in suspension. It is also possible to combine two or more of these polymerization methods in order to carry out, for example, polymerization in bulk in solution, polymerization in bulk in suspension or emulsion-suspension polymerization. The polymerization is preferably carried out in the presence of the usual substances, such as free-radical donors, optionally in combination with a redox system, chain regulators, stabilizers, suspending agents, emulsifiers and the like.

According to one preferred method of achieving the invention, the compound (B) is an acrylonitrile-butadiene-styrene (ABS) copolymer. It may possibly be grafted or functionalized. Its concentration may vary from 1 to 97% by weight, preferably from 20 to 40% by weight, with respect to the total weight of the blend.

The component (C) is a styrene-maleimide copolymer grafted with functional groups chosen from carboxylic acids and acid anhydrides. Styrene-maleimide copolymer is understood to mean a polymer having units derived from styrene and maleimide units of the formula (I)

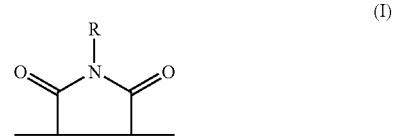

(I)

in which R is chosen from hydrogen, alkyl radicals, aromatic radicals and arylaromatic radicals. An example of R is a phenyl group. The maleimide unit may be chosen, for example, from N-phenylmaleimide, N-(o-methylphenylmaleimide), N-(m-methylphenylmaleimide), N-(p-methylphenylmaleimide). Copolymers of this type may, for example, be obtained by copolymerization of styrene and maleic anhydride followed by partial reaction with an amine, such as aniline, to form the maleimide units from anhydride units.

The anhydride units which have not reacted with the amine constitute the functionalization.

The component (D) is an ungrafted styrene-maleimide copolymer. Styrene-maleimide copolymer is understood to mean a polymer having units derived from styrene and units of the formula (I)

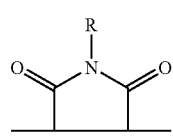

in which R is chosen from hydrogen, alkyl radicals, aromatic radicals and arylaromatic radicals. An example of R is a phenyl group. Copolymers of this type may, for example, be obtained by copolymerization of styrene and maleic anhydride followed by partial reaction with an amine, such as aniline, to form the maleimide units from anhydride units.

The proportion of maleimide groups in the compounds (C) and (D) is preferably between 5 and 50%.

The proportion by weight of the functional groups grafted onto the styrene-maleimide copolymer, with respect to the total weight of styrene-maleimide copolymer present in the composition, is between 0.1 and 3%.

The compositions may comprise a proportion of not more than 50% by weight of an impact modifier (E). According to one preferred feature of the invention this agent is an elastomer or a rubbery polymer, preferably grafted with functional groups chosen from carboxylic acids and acid anhydrides. The grafting of acid anhydride functions of copolymers is generally achieved by copolymerization in the presence of maleic anhydride.

The rubbery polymers which may be used as impact modifiers are defined as having a tensile modulus to ASTM D-638 of less than about 40,000 MPa, generally less than 25,000, and preferably less than 20,000. They may be random or block copolymers. Useful rubbery polymers may be prepared from reactive monomers which can be part of the chains or branches of the polymer, or can be grafted onto the polymer. These reactive monomers may be dienes or carboxylic acids or their derivatives, such as esters or anhydrides. Amongst these rubbery polymers mention may be made of butadiene polymers, copolymers of butadiene/styrene, isoprene, chloroprene, copolymers of acrylonitrile/butadiene, isobutylene, copolymers of isobutylene-butadiene or copolymers of ethylene/propylene (EPR), copolymers of ethylene/propylene/diene (EPDM). As useful rubbery polymers mention may be made of aromatic vinylic monomers, olefins, acrylic acid, methacrylic acid and derivatives of these, ethylene-propylene-diene monomers, and metal salts of these. Some useful rubbery polymers are described in the patents U.S. Pat. Nos. 4,315,086 and 4,174,358.

A first preferred impact modifier for carrying out the invention is a grafted copolymer which is a copolymer of ethylene and of an α-olefin other than ethylene having, grafted onto the ethylene copolymer, a functionality such as carboxylic or anhydride functions. The ethylene and the α-olefin are preferably a copolymer of ethylene and of an α-olefin selected from an α-olefin containing from 3 to 8 carbon atoms and preferably from 3 to 6 carbon atoms. A preferred α-olefin monomer in the copolymer is propylene. Other α-olefins, such as 1-butene, 1-pentene and 1-hexene, may be used in the copolymers in place of or in addition to propylene. In one preferred manner of working the invention, mention may be made of maleic-anhydride-grafted ethylene-propylene rubbers and maleic-anhydride-grafted ethylene-propylene-diene rubbers.

The compositions may include a copolymer (F), its proportion being below or equal to 50% by weight. The copolymer (F) is an olefin-styrene copolymer having a molar mass of between 8,000 and 12,000 g/mol, grafted with groups derived from carboxylic acids, for example carboxylates, anhydrides, etc. This type of copolymer is available commercially. Mention is more particularly made of styrene-ethylene-butylene-styrene copolymer modified with maleic anhydride (SEBS-G-MA). The proportion of copolymer (F) by weight in the composition is advantageously between 0.5 and 10%. It is preferably below 5%.

The proportion of polyamide by weight in the composition is advantageously greater than the proportion by weight of the compound (B). It is preferably between 30 and 70%. According to another preferred characteristic of the invention, the total of the proportions by weight of compounds (C) and (D) is less than the proportion by weight of polyamide.

According to one particularly advantageous embodiment, the proportions by weight of the various compounds in the composition are the following:

30 to 70% of polyamide (A)
20 to 40% of compound (B)
5 to 20% of compound (C)
1 to 10% of compound (D)
0 to 20% of compound (E)
0.5 to 10% of compound (F)

These percentages given are based on the entirety of constituents (A), (B), (C), (D), (E) and (F) present in the composition.

The compositions may comprise mineral fillers, such as talc, kaolin, mica, quartz, etc. and/or fibrous fillers, such as glass fibre or carbon fibre, etc. They may also comprise additives, such as heat stabilizers or products to counter degradation due to light or to oxidation, flame retardants, lubricants, pigments, for example carbon black.

The compositions according to the invention have excellent compatibility of the polyamide with the acrylonitrile-butadiene-styrene copolymer.

The compositions may be obtained by blending the compounds in the melt, for example with the aid of an extrusion apparatus.

The articles obtained by shaping these compositions have excellent mechanical properties and excellent paintability.

Other details or advantages of the invention will be further clarified in the examples given below, purely by way of example.

Compounds Used:

Compound A1: a nylon-6 of relative viscosity (sulphuric acid, ISO 307 standard) 3.0, marketed by Hyosung Corporation as Toplamid 1021.

Compound B1: acrylonitrile-butadiene-styrene copolymer marketed by Kumho Chemical as ABS 795.

Compound C1: styrene-maleimide copolymer functionalized by maleic anhydride, marketed by Nippon Shokubai as PSX 0371.

Compound D1: non-functionalized styrene-maleimide copolymer marketed by Nippon Shokubai as PAS 1460.

Compound E1: ethylene-propylene rubber functionalized by maleic anhydride, marketed by Mitsui Chemical as MP 0620.

Compound F1: styrene-ethylene-butylene-styrene copolymer functionalized by maleic anhydride, marketed by Shell as FG1901X.

Evaluation tensile strength according to the standard ASTM D-638 after conditioning the specimen at 23° C. and 50% relative humidity elongation at break according to the standard ASTM D-638.

modulus according to the standard D-790.

IZOD impact resistance according to the standard D-256, using impacts of 3.2 t and 6.4 t.

deformation temperature under load (HDT) according to the standard ASTM D 648, using a load of 4.6 kg/cm² and of 18.5 kg/cm².

EXAMPLES

The compositions are obtained by blending in a twin-screw extruder of WERNER and PFLEIDERER ZSK type. The conditions of extrusion are as follows:

Temperature: between 240 and 280° C.
Rate of rotation: between 200 and 300 rpm
Throughput: between 25 and 30 kg/hour The details of the compositions produced are given in Table I. The proportions are indicated in percentages by weight in the composition.

TABLE 1

| Compound | Example 1 | Example 2 (comparative) |
| --- | --- | --- |
| A1 | 42% | 42% |
| B1 | 35% | 35% |
| C1 | 10% | 15% |
| D1 | 5% | / |
| E1 | 6% | 6% |
| F1 | 2% | 2% |

The properties are shown in Table II

TABLE II

| Property | Example 1 | Example 2 |
| --- | --- | --- |
| Tensile strength (kgf/cm²) | 515 | 529 |
| Elongation at break (%) | 170 | 148 |
| Flexural modulus (kgf/cm²) | 21000 | 22000 |
| Izod impact resistance using an impact of 3.2 t (kgf.cm/cm) | 105 | 92 |
| Izod impact resistance using an impact of 6.4 t (kgf.cm/cm) | 90 | 62 |
| HDT under a load of 4.6 kgf/cm² (° C.) | 120 | 122 |
| HDT under a load of 18.5 kgf/cm² (° C.) | 98 | 104 |

The invention claimed is:

1. Thermoplastic polymeric composition comprising the following compounds:
   (A) from 1 to 97% by weight, with respect to the total weight of the composition, of a polyamide,
   (B) from 1 to 97% by weight, with respect to the total weight of the composition, of a copolymer containing a rubber onto which are grafted acrylonitrile and a styrenic compound selected from the group consisting of styrene and α-methylstyrene, the copolymer containing from 10 to 90% by weight of rubber,
   (C) from 0.5 to 97% by weight, with respect to the total weight of the composition, of a styrene-maleimide copolymer having functional groups selected from the group consisting of carboxylic acids and acid anhydrides,
   (D) from 0.5 to 97% by weight, with respect to the total weight of the composition, of a styrene-maleimide copolymer,
   (E) from 0 to 50% of an impact modifier, and
   (F) from 0 to 50% by weight of a maleic-anhydride-grafted styrene-ethylene-butylene-styrene copolymer,
   wherein the proportion of polyamide (A) by weight is greater than the proportion of copolymer (B) by weight.

2. Composition according to claim 1, wherein the copolymer B is an acrylonitrile-styrene-butadiene copolymer.

3. Composition according to claim 2, wherein the impact modifier is an elastomer.

4. Composition according to claim 3, wherein the elastomer is an elastomer grafted with functional groups selected from the group consisting of carboxylic acids and acid anhydrides.

5. Composition according to claim 1, wherein the functional groups of the copolymer C are obtained by copolymerization in the presence of maleic anhydride.

6. Composition according to claim 1, wherein the proportion by weight of the functional groups in the styrene-maleimide copolymer, with respect to the total weight of styrene-maleimide copolymer present in the composition, is between 0.1 and 3%.

7. Composition according to claim 1, wherein the maleimide groups present in the copolymers (C) and (D) are phenylmaleimide groups.

8. Composition according to claim 1, wherein the impact modifier is selected from the group consisting of maleic-anhydride-grafted ethylene-propylene rubber, maleic-anhydride-grafted ethylene-propylene-diene rubber, maleic-anhydride-grafted polyethylenes, and maleic-anhydride-grafted polypropylene.

9. Composition according to claim 1, wherein the polyamide is selected from the group consisting of nylon-6, nylon-11, nylon-12, the copolyamide nylon-6/6,36, copolymers of nylon-6, nylon-11 and nylon-12 and mixtures of said polyamides.

10. Composition according to claim 1, wherein the proportion of polyamide by weight is greater than the total of the proportions of compounds (C) and (D).

11. Composition according to claim 1, wherein the proportions of the compounds by weight are the following:
   30 to 70% of polyamide (A)
   20 to 40% of compound (B)
   5 to 20% of compound (C)
   1 to 10% of compound (D)
   0 to 20% of compound (B)
   0.5 to 10% of compound (F).

* * * * *